United States Patent [19]

Lee et al.

[11] Patent Number: 4,755,987

[45] Date of Patent: Jul. 5, 1988

[54] HIGH SPEED SCRAMBLING AT LOWER CLOCK SPEEDS

[75] Inventors: Pil J. Lee, Somerville; Sang H. Lee, Bridgewater, both of N.J.

[73] Assignee: Bell Communications Research, Inc., Livingston, N.J.

[21] Appl. No.: 59,788

[22] Filed: Jun. 5, 1987

[51] Int. Cl.[4] .............................................. H04J 3/02
[52] U.S. Cl. ........................................ 370/77; 370/18; 375/1
[58] Field of Search ....................... 370/77, 18, 19, 20, 370/112, 119; 375/1; 380/46, 47, 43, 49, 50

[56] References Cited

U.S. PATENT DOCUMENTS

| 3,025,350 | 3/1962 | Lindner | 370/77 |
| 3,634,765 | 1/1972 | Gutleber | 370/18 |
| 4,134,071 | 1/1979 | Ohnsorge | 375/1 |

OTHER PUBLICATIONS

"Air-Ground, Ground-Air Communications Using Pseudo-Noise Through a Satellite", by Blasbalg et al, in IEEE Trans. on Aerospace and Electronicsystems, vol. AES 4, No. 5, Sep. 1968, pp. 774–777.

"A 2-Level, 274 Mb/s Regenerative Repeater for T4M," F. D. Waldhauer, Proc. IEEE Int. Conf. on Communications, pp. 48.13–48.17, 1975.

"FT3C-A Lightwave System for Metropolitan and InterCity Applications," J. R. Stauffer, IEEE Journal on Selected Areas in Communications, vol. SAC-1, pp. 413–419, Apr. 1983.

"A 200 Mbit/s Synchronous TDM Loop Optical LAN Suitable for Multiservice Integration," T. Minami et al, IEEE Journal on Selected Areas in Communications, vol. SAC-3, No. 6, pp. 849–858, Nov. 1985.

"Multiport Modulo-2 Generators of Pseudorandom Binary Sequences," O. Brugia, et al., Proc. IEEE Int. Symp. on Circuit and Systems, pp. 852–855, 1982.

*Shift Register Sequences*, Golomb, revised edition, Aegean Park Press, pp. 78–79, 1983.

*Spread Spectrum Communications*, M. K. Simon et al, vol. 1, Computer Science Press, pp. 303–305, 1985.

*Primary Examiner*—Douglas W. Olms
*Attorney, Agent, or Firm*—James W. Falk

[57] ABSTRACT

Circuitry generates a plurality of differently-phased m-sequences (or pseudo-random sequences) for scrambling/descrambling of all tributary data signals at a multiplexer/demultiplexer. By scrambling/descrambling at the tributary levels and thus at the lower tributary clock rates, less complex circuitry can be employed, and by properly selecting the tributary scrambling sequences in accordance with the teachings of this invention, a desired high speed line sequence can be attained.

8 Claims, 8 Drawing Sheets

|  1  |  3  |
|-----|-----|
| 13 (7) | 15 |
| 15 (4) | 13 |

|  1  |  7  |
|-----|-----|
| 23 (7) | 31 |
| 31 (1) | 23 |

|  1  |  3  |  5  |  7  | 11  | 15  |
|-----|-----|-----|-----|-----|-----|
| 45 (20) | 75 | 67 | 57 | 73 | 51 |
| 51 (22) | 57 | 73 | 75 | 67 | 45 |
| 57 (37) | 73 | 45 | 67 | 51 | 75 |
| 75 (22) | 67 | 51 | 73 | 45 | 57 |
| 67 (35) | 51 | 57 | 45 | 75 | 73 |
| 73 (35) | 45 | 75 | 51 | 57 | 67 |

|  1  |  5  | 11  | 13  | 23  | 31  |
|-----|-----|-----|-----|-----|-----|
| 103 (37) | 147 | 155 | 133 | 163 | 141 |
| 141 (01) | 163 | 133 | 155 | 147 | 103 |
| 133 (33) | 103 | 147 | 163 | 141 | 155 |
| 155 (04) | 141 | 163 | 147 | 103 | 133 |
| 147 (32) | 155 | 141 | 103 | 133 | 163 |
| 163 (37) | 133 | 103 | 141 | 155 | 147 |

|  1  |  7  | 11  | 13  | 19  | 23  | 29  | 31  | 37  | 43  | 47  | 53  | 59  | 61  | 91  | 127 |
|-----|-----|-----|-----|-----|-----|-----|-----|-----|-----|-----|-----|-----|-----|-----|-----|
| 435 (026) | 551 | 747 | 453 | 545 | 543 | 615 | 455 | 537 | 703 | 651 | 607 | 515 | 717 | 765 | 561 |
| 561 (004) | 455 | 717 | 651 | 515 | 615 | 543 | 551 | 765 | 607 | 453 | 703 | 545 | 747 | 537 | 435 |
| 453 (154) | 765 | 455 | 607 | 561 | 747 | 717 | 537 | 543 | 545 | 703 | 515 | 435 | 551 | 615 | 651 |
| 651 (027) | 537 | 551 | 703 | 435 | 717 | 747 | 765 | 615 | 515 | 607 | 545 | 561 | 455 | 543 | 453 |
| 455 (022) | 515 | 703 | 537 | 717 | 651 | 453 | 545 | 561 | 615 | 765 | 543 | 747 | 607 | 435 | 551 |
| 551 (026) | 545 | 607 | 765 | 747 | 453 | 651 | 515 | 435 | 543 | 537 | 615 | 717 | 703 | 561 | 455 |
| 515 (027) | 717 | 543 | 435 | 703 | 537 | 765 | 747 | 455 | 651 | 561 | 453 | 607 | 615 | 551 | 545 |
| 545 (005) | 747 | 615 | 561 | 607 | 765 | 537 | 717 | 551 | 453 | 435 | 651 | 703 | 543 | 455 | 515 |
| 537 (172) | 435 | 545 | 543 | 551 | 703 | 607 | 561 | 651 | 717 | 615 | 747 | 455 | 515 | 453 | 765 |
| 765 (004) | 561 | 515 | 615 | 455 | 607 | 703 | 435 | 453 | 747 | 543 | 717 | 651 | 545 | 651 | 537 |
| 543 (173) | 453 | 561 | 747 | 765 | 545 | 515 | 651 | 703 | 551 | 717 | 455 | 537 | 435 | 607 | 615 |
| 615 (026) | 651 | 435 | 717 | 537 | 515 | 545 | 453 | 607 | 455 | 747 | 551 | 765 | 561 | 703 | 543 |
| 607 (154) | 615 | 537 | 515 | 651 | 455 | 551 | 543 | 747 | 561 | 545 | 435 | 453 | 765 | 717 | 703 |
| 703 (177) | 543 | 765 | 545 | 453 | 551 | 455 | 615 | 717 | 435 | 515 | 561 | 651 | 537 | 747 | 607 |
| 717 (177) | 703 | 453 | 551 | 543 | 435 | 561 | 607 | 515 | 537 | 455 | 765 | 615 | 651 | 545 | 747 |
| 747 (151) | 607 | 651 | 455 | 615 | 561 | 435 | 703 | 545 | 765 | 551 | 537 | 537 | 453 | 515 | 717 |

| | 1 | 3 | 5 | 7 | 9 | 11 | 13 | 15 | 19 | 21 | 23 | 27 | 29 | 31 | 43 | 47 | 55 | 63 |
|---|---|---|---|---|---|---|---|---|---|---|---|---|---|---|---|---|---|---|
| 203 | (177) | 253 | 217 | 375 | 271 | 211 | 345 | 277 | 357 | 313 | 247 | 367 | 221 | 325 | 323 | 361 | 235 | 301 |
| 301 | (100) | 325 | 361 | 277 | 235 | 221 | 247 | 375 | 367 | 323 | 345 | 357 | 211 | 253 | 313 | 217 | 271 | 203 |
| 211 | (111) | 217 | 235 | 367 | 277 | 325 | 203 | 357 | 313 | 345 | 301 | 323 | 253 | 361 | 247 | 271 | 375 | 221 |
| 221 | (100) | 361 | 271 | 357 | 375 | 253 | 301 | 367 | 323 | 247 | 203 | 313 | 325 | 217 | 345 | 235 | 277 | 211 |
| 217 | (177) | 277 | 357 | 345 | 323 | 235 | 253 | 247 | 301 | 221 | 325 | 203 | 271 | 375 | 211 | 367 | 313 | 361 |
| 361 | (102) | 375 | 367 | 247 | 313 | 271 | 325 | 345 | 203 | 211 | 253 | 301 | 235 | 277 | 221 | 357 | 323 | 217 |
| 235 | (113) | 357 | 313 | 203 | 247 | 375 | 217 | 301 | 221 | 253 | 361 | 211 | 277 | 367 | 325 | 323 | 345 | 271 |
| 271 | (113) | 367 | 323 | 301 | 345 | 277 | 361 | 203 | 211 | 325 | 217 | 221 | 375 | 357 | 253 | 313 | 247 | 235 |
| 247 | (164) | 211 | 325 | 271 | 217 | 301 | 323 | 235 | 375 | 367 | 313 | 277 | 203 | 221 | 357 | 253 | 361 | 345 |
| 345 | (102) | 221 | 253 | 235 | 361 | 203 | 313 | 271 | 277 | 357 | 323 | 375 | 301 | 211 | 367 | 325 | 217 | 247 |
| 253 | (166) | 271 | 277 | 313 | 367 | 217 | 221 | 323 | 247 | 301 | 211 | 345 | 361 | 235 | 203 | 375 | 357 | 325 |
| 325 | (100) | 235 | 375 | 323 | 357 | 361 | 211 | 313 | 345 | 203 | 221 | 247 | 217 | 271 | 301 | 277 | 367 | 253 |
| 277 | (177) | 323 | 247 | 221 | 203 | 357 | 271 | 211 | 325 | 361 | 235 | 253 | 367 | 313 | 217 | 345 | 301 | 375 |
| 375 | (111) | 313 | 345 | 211 | 301 | 367 | 235 | 221 | 253 | 217 | 271 | 325 | 357 | 323 | 361 | 247 | 203 | 277 |
| 313 | (164) | 301 | 221 | 217 | 325 | 345 | 357 | 361 | 271 | 277 | 367 | 235 | 247 | 203 | 375 | 211 | 253 | 323 |
| 323 | (175) | 203 | 211 | 361 | 253 | 247 | 367 | 217 | 235 | 375 | 357 | 271 | 345 | 301 | 277 | 221 | 325 | 313 |
| 357 | (175) | 247 | 301 | 253 | 211 | 313 | 277 | 325 | 361 | 271 | 375 | 217 | 323 | 345 | 235 | 203 | 221 | 367 |
| 367 | (166) | 345 | 203 | 325 | 221 | 323 | 375 | 253 | 217 | 235 | 277 | 361 | 313 | 247 | 271 | 301 | 211 | 357 |

FIG. 6

| N \ J | 7 | 15 | 31 | 63 | 127 | 255 | 511 | 1023 | 2047 | 4095 | 8191 |
|---|---|---|---|---|---|---|---|---|---|---|---|
| 2 | 4 | 8 | 16 | 32 | 64 | 128 | 256 | 512 | 1024 | 2048 | 4096 |
| 3 | 5 | -- | 21 | -- | 85 | -- | 341 | -- | 1365 | -- | 5461 |
| 4 | 2 | 4 | 8 | 16 | 32 | 64 | 128 | 256 | 512 | 1024 | 2048 |
| 5 | 3 | -- | 25 | 38 | 51 | -- | 409 | 614 | 819 | -- | 6553 |
| 6 | 6 | -- | 26 | -- | 106 | -- | 426 | -- | 1706 | -- | 6826 |
| 7 | -- | 13 | 9 | -- | 109 | 73 | -- | 877 | 585 | -- | 7021 |
| 8 | 1 | 2 | 4 | 8 | 16 | 32 | 64 | 128 | 256 | 512 | 1024 |
| 9 | 4 | -- | 7 | -- | 113 | -- | 284 | -- | 455 | -- | 7281 |
| 10 | 5 | -- | 28 | 19 | 89 | -- | 460 | 307 | 1433 | -- | 7372 |
| 11 | 2 | 11 | 17 | 23 | 104 | 116 | 93 | -- | 1861 | 2606 | 2234 |
| 12 | 3 | -- | 13 | -- | 53 | -- | 213 | -- | 853 | -- | 3413 |
| 13 | 6 | 7 | 12 | 34 | 88 | 157 | 118 | 787 | 315 | -- | 7561 |
| 14 | -- | 14 | 20 | -- | 118 | 164 | -- | 950 | 1316 | -- | 7606 |
| 15 | 1 | -- | 29 | -- | 17 | -- | 477 | -- | 273 | -- | 7645 |
| 16 | 4 | 1 | 2 | 4 | 8 | 16 | 32 | 64 | 128 | 256 | 512 |
| 17 | 5 | 8 | 11 | 26 | 15 | -- | 481 | 662 | 1445 | 2168 | 2891 |
| 18 | 2 | -- | 19 | -- | 120 | -- | 142 | -- | 1251 | -- | 7736 |
| 19 | 3 | 4 | 18 | 10 | 107 | 94 | 269 | 700 | 431 | 3664 | 3880 |
| 20 | 6 | -- | 14 | 41 | 108 | -- | 230 | 665 | 1740 | -- | 3686 |
| 21 | -- | -- | 3 | -- | 121 | -- | -- | -- | 195 | -- | 7801 |
| 22 | 1 | 13 | 24 | 43 | 52 | 58 | 302 | -- | 1954 | 1303 | 1117 |
| 23 | 4 | 2 | 27 | 11 | 116 | 122 | 200 | 89 | -- | 3917 | 5342 |
| 24 | 5 | -- | 22 | -- | 90 | -- | 362 | -- | 1450 | -- | 5802 |
| 25 | 2 | -- | 5 | 58 | 61 | -- | 184 | 532 | 1392 | -- | 4587 |
| 26 | 3 | 11 | 6 | 17 | 44 | 206 | 59 | 905 | 1181 | -- | 7876 |
| 27 | 6 | -- | 23 | -- | 80 | -- | 265 | -- | 834 | -- | 2427 |
| 28 | -- | 7 | 10 | -- | 59 | 82 | -- | 475 | 658 | -- | 3803 |
| 29 | 1 | 14 | 15 | 50 | 92 | 44 | 141 | 635 | 1200 | 3389 | 5649 |
| 30 | 4 | -- | 30 | -- | 72 | -- | 494 | -- | 1160 | -- | 7918 |
| 31 | 5 | 1 | -- | 61 | 41 | 181 | 33 | -- | 1981 | 1321 | 5813 |
| 32 | 2 | 8 | 1 | 2 | 4 | 8 | 16 | 32 | 64 | 128 | 256 |
| 33 | 3 | -- | 16 | -- | 77 | -- | 31 | -- | 1985 | -- | 3475 |
| 34 | 6 | 4 | 21 | 13 | 71 | -- | 496 | 331 | 1746 | 1084 | 5541 |
| 35 | -- | -- | 8 | -- | 98 | -- | -- | 380 | 117 | -- | 7957 |
| 36 | 1 | -- | 25 | -- | 60 | -- | 71 | -- | 1649 | -- | 3868 |
| 37 | 4 | 13 | 26 | 46 | 103 | 193 | 221 | 553 | 166 | 3763 | 6420 |
| 38 | 5 | 2 | 9 | 5 | 117 | 47 | 390 | 350 | 1239 | 1832 | 1940 |
| 39 | 2 | -- | 4 | -- | 114 | -- | 380 | -- | 105 | -- | 7981 |
| 40 | 3 | -- | 7 | 52 | 54 | -- | 115 | 844 | 870 | -- | 1843 |
| 41 | 6 | 11 | 28 | 20 | 31 | 56 | 349 | 524 | 699 | 3296 | 6393 |
| 42 | -- | -- | 17 | -- | 124 | -- | -- | -- | 1121 | -- | 7996 |
| 43 | 1 | 7 | 13 | 22 | 65 | 172 | 309 | 571 | 1809 | 2857 | 381 |
| 44 | 4 | 14 | 12 | 53 | 26 | 29 | 151 | -- | 977 | 2699 | 4654 |
| 45 | 5 | -- | 20 | -- | 48 | -- | 159 | -- | 91 | -- | 8009 |
| 46 | 2 | 1 | 29 | 37 | 58 | 61 | 100 | 556 | -- | 4006 | 2671 |
| 47 | 3 | 8 | 2 | 59 | 100 | 38 | 87 | 653 | 392 | 3398 | 3137 |
| 48 | 6 | -- | 11 | -- | 45 | -- | 181 | -- | 725 | -- | 2901 |
| 49 | -- | 4 | 19 | -- | 70 | 229 | -- | 856 | 376 | -- | 1003 |
| 50 | 1 | -- | 18 | 29 | 94 | -- | 92 | 266 | 696 | -- | 6389 |

FIG. 7

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| a) 45 (20) | 1 | 0 | 0 | 0 | 0 | 1 | 0 | 1 | 0 | 1 | 1 | 1 | 0 | 1 | 1 | 0 | 0 | 0 | 1 | 1 | 1 | 1 | 1 | 0 | 0 | 1 | 1 | 0 | 1 | 0 | 0 |
| b) 51 (22) | 1 | 0 | 0 | 1 | 0 | 1 | 1 | 0 | 0 | 1 | 1 | 1 | 1 | 1 | 0 | 0 | 0 | 1 | 1 | 0 | 1 | 1 | 1 | 0 | 1 | 0 | 1 | 0 | 0 | 0 | 0 |
| c) 57 (37) | 1 | 1 | 1 | 1 | 1 | 0 | 1 | 1 | 1 | 0 | 0 | 0 | 1 | 0 | 1 | 0 | 1 | 1 | 0 | 1 | 0 | 0 | 0 | 0 | 1 | 1 | 0 | 0 | 1 | 0 | 0 |
| d) 75 (22) | 1 | 0 | 0 | 1 | 0 | 0 | 1 | 1 | 0 | 0 | 0 | 0 | 1 | 0 | 1 | 1 | 0 | 1 | 0 | 1 | 0 | 0 | 0 | 1 | 1 | 1 | 0 | 1 | 1 | 1 | 1 |
| e) 67 (35) | 1 | 1 | 1 | 0 | 1 | 1 | 0 | 0 | 1 | 1 | 1 | 0 | 0 | 0 | 0 | 1 | 1 | 0 | 1 | 0 | 1 | 0 | 0 | 1 | 0 | 0 | 0 | 1 | 0 | 1 | 1 |
| f) 73 (35) | 1 | 1 | 1 | 0 | 1 | 0 | 0 | 0 | 1 | 0 | 0 | 1 | 0 | 1 | 0 | 1 | 1 | 0 | 0 | 0 | 0 | 1 | 1 | 1 | 0 | 0 | 1 | 1 | 0 | 1 | 1 |

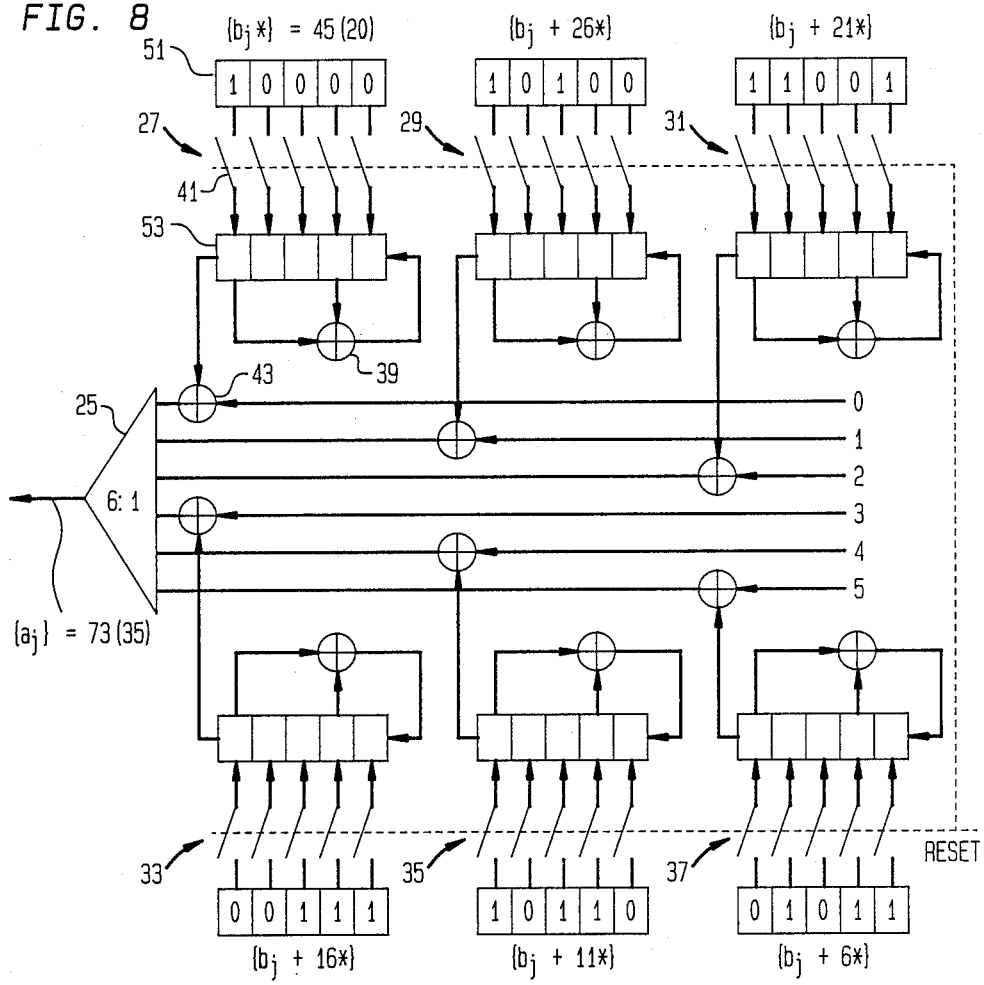
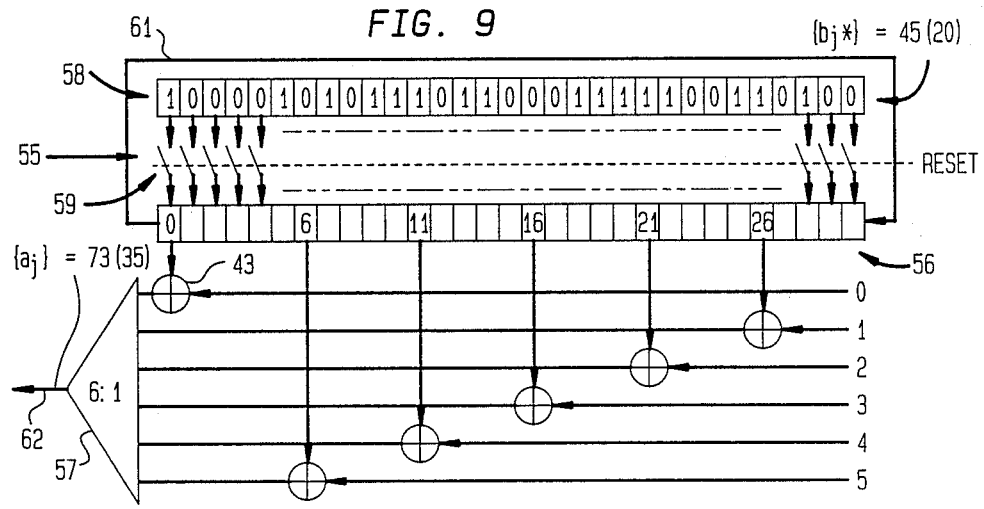

HIGH SPEED SCRAMBLING AT LOWER CLOCK SPEEDS

FIELD OF THE INVENTION

The invention relates to techniques and circuitry for the scrambling of digital multiplexed communications signals in an efficient manner.

RELATED APPLICATIONS

Reference is made to application Ser. No. 864,037, filed May 16, 1986, by J. A. Bellislo, entitled "Multilevel Multiplexing" which issued on Jan. 12, 1988 as U.S. Pat. No. 4,719,624 and application Ser. No. 921,522, filed Oct. 22, 1986, by S. H. Lee, entitled "Multiplex Digital Communication Systems", both assigned to the same assignee as this invention, as related applications.

BACKGROUND OF THE INVENTION

The operation of digital transmission systems required certain characteristics in the incoming digital data streams at receivers and regenerators. The proper clock recovery of NRZ (non-return-to-zero) digital signals requires a minimum density of transitions in the digital stream, transition being a change in signal voltage level caused by a change in the signal from binary 1 to binary 0, or vice versa. Also, in accoupled systems, the average density of binary 1's to binary 0's should approximately satisfied through the scrambling of the data signals with a repetitive digital pseudo random sequence which will provide the required transitions and average density on the high speed lines which carry the multiplexed digital signals. At any receiver or regenerator in the system the scrambling can be removed by means of a descrambler to yield the data signals.

Present day fiber optic time division multiplexed systems operate in the multi-gigabit frequency range. Since bandwidth is limited by the electronic devices and not by the fiber itself, it is highly desirable to perform the complex electronic processing at the low speed parallel (or tributary) signal levels at the inputs of multiplexers and the outputs of demultiplexers. In this way the highest-speed circuitry is limited to the final multiplexer stages and to the initial demultiplexer stages, which can be merely bit interleavers and deinterleavers.

Thus it is desirable to perform the aforementioned scrambling at parallel or tributary levels where bit rates are low. In general, the independent (or uncoordinated) scrambling of parallel signal tributaries at the input of a multiplexer does not produce the same high speed line statistics (or high speed scrambling sequence) as compared to performing a single scrambling operation at the serial or high speed level at the multiplexer output. The line conditioning produced by independent tributary scrambling cannot be better than that produced by high speed For example, if independent parallel scrambling codes or sequences each have any given number of consecutive 1's or 0's therein, where N is the number of lines bing multiplexed. For the above reasons, independent tributary scrambling has been only used when N is small, or in combination with simple line coding. In this regard see F. D. Waldhauser, *A 2-level, 274 Mb/s Regenerative Repeater for T4/M*, Proc. IEEE Int. Conf. on Communications., pp 48.13-17, 1975; J. R. Stauffer, *FT 3C- A Lightwave System for Metropolitan and Intercity Applications*, IEEE J. Selected Areas on Communications, Vol. SAC-1, pp 413-419, April 1983; and T. Minami, et al, *A 200 M bits/s Synchronous TDM Loop Optical LAN Suitable for Multiserver Integration*, IEEE J. Selected Areas on Communications, Vol. SAC-3, pp 849-858, 1985.

The present invention describes techniques and circuitry wherein the scrambling of the parallel tributary signals is coordinated in such a way that it produces any desired and predictable high speed line statistics just as though the scrambling were done in the serial high speed line. Previous efforts in tributary scrambling are reported in 0. Brugia, et al, *Multiport Modula-2 Generators of Pseudorandom Binary Sequences*, Proc. IEEE Int. Symp. on Circuit and Systems, pp 852-855, 1982, in which a d-transform approach is used. That approach is a design procedure using combinatorial circuitry in which some of the feedback register stages are connected to each tributary input line of an N to 1 multiplexer to produce an N times high speed line m-sequence. Besides the difficultly of designing combinatorial circuitry, the multiplexing factor, N, is limited to integral powers of 2.

The present co-inventor Sang Hoon Lee in a copending application entitled *Multiplex Digital Communications System*, Ser. No. 921,522, filed on Oct. 22, 1986, discloses much simpler techniques and circuitry for utilizing the properties of m-sequences, also known as pseudo random sequences, to achieve coordinated tributary scrambling and hence predictable high speed line conditioning.

SUMMARY OF THE INVENTION

The present invention is an extension of the work disclosed in the aforementioned co-pending application, in which the required equivalent tributary sequences may be derived for any multiplexing factor, N, so long as it is relatively prime to the required sequence length, J. This makes possible the universal usage of parallel or tributary scrambling in any high speed multiplex system. Further, given the equivalent tributary sequences, the information disclosed herein permits the resultant high speed sequence to be precisely determined, including the phasing thereof, and vice versa.

The invention also involves novel circuitry for implementing these tributary scrambling and descrambling techniques. For example, the circuitry includes a single J-stage register (wherein J is the period, or number of binary digits of the tributary scrambling sequences), which is capable of providing N different scrambling sequences, one for each tributary line applied to an N to bit interleaved multiplexer (or one sequence for each tributary line in the output of a 1 to N demultiplexer).

The novel circuitry also comprises such a single J-stage scrambling register used in a multistage or multilevel multiplexed system.

The invention also comprises a multiplexer (demultiplexer) comprising a single J-stage register as part of a multiplex (demultiplex) system in which the multiplexing factor, N, can be changed and for each different N a different set of J-stage register taps is selected for use in scrambling (descrambling) of the intelligence signals at the multiplexer (demultiplexer) tributary lines. The selected taps will provide the proper coordinated tributary sequences to provide a predetermined scrambling sequence on the high speed lines or the system.

It is thus an object of the invention to facilitate the scrambling of high speed digital lines at low tributary clock rates in frame-synchronous time division bit interleaved multiplexed systems.

Another object of the invention is to permit, in binary digital multiplexed systems, the proper selection of equivalent tributary codes required to produce any given high speed line code or sequence for any multiplexing factor N, as long as the scrambling sequence period or length, J, and N are relatively prime, wherein N is the multiplexing factor.

A further object is to provide novel circuitry for scrambling low speed tributary lines at multiplexers in a digital transmission system to achieve a desired and predictable scrambling pattern on the high speed line of such systems.

A further object of the invention is to provide a novel tributary scrambling/descrambling system in which N scrambling/descrambling m-sequences are obtained from a single circulating or ring register of J bits length.

Another object of the invention is to provide a multiplexer/demultiplexer for time division multiplexed fiber optic systems wherein the multiplexing factor N may be changed and wherein a single register of J stages provides all of the m-sequences of length J used for scrambling/descrambling the tributary signals at said multiplexer/demultiplexer.

These and other objects and advantages of the invention will become apparent from the following detailed description and the drawing.

BRIEF DESCRIPTION OF THE DRAWING

FIGS. 5a-5f are six tables which can be used to select the proper tributary scrambling sequences to achieve any desired high speed scrambling sequence, for sequences from J=7 to J=255.

FIG. 6 is a table of values of $\delta$, the scrambling sequence phase offset between each adjacent tributary scrambling/descrambling sequence.

FIG. 7 shows all six of the cyclically distinct binary digital m-sequences listed in FIG. 5c.

FIGS. 8 and 9 are diagrams showing two ways in which tributary scrambling/descrambling may be implemented.

DETAILED DESCRIPTION

Scrambling of digital signals is accomplished by means of pseudo random sequences, also called pseudo-noise (PN) sequences or m-sequences. Such sequences are binary sequences of period of (length) J digits, where $J=2^L-1$. These m-sequences are defined by primitive polynomials, f(x), of degree L, wherein L is the highest power of the variable x in the polynomial. A linear feedback shift register (LFSR) can be used to generate any such m-sequence by arranging appropriate feedback through modulo-2 adders wherein the outputs of the LFSR stages representing the terms of the polynomial are applied to the register serial input. Such a register with L stages is capable of repetitively generating an m-sequence of $J=2^L-1$ bits. It should be noted that the present mathematical analysis uses different notation than that of the aforementioned co-pending application.

Figure 1:
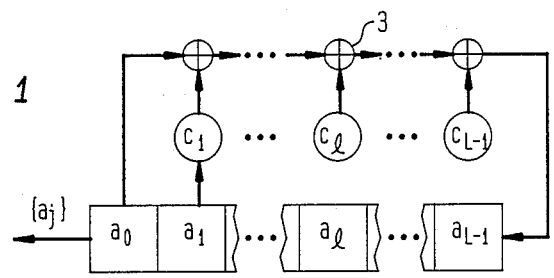
FIG. 1 is a diagram of a linear feedback shift register (LFSR) of L stages.

Consider a sequence $\{a_j\}$ generated at the serial output of an LFSR of L stages, such as that of FIG. 1, wherein $c_l=1$ indicates that the $(1+l)^{th}$ register stage (from the left) has a feedback connection through a modulo-2 adder 3, while $c_l=0$ indicates no such connection. The characteristic primitive polynomial f(x) of such an LFSR is defined by the feedback coefficients $c=(1,c_l,..,c_{L-1},1)$ sas;

$$f(x) = \sum_{l=0}^{L} c_l x^l \qquad (1)$$

with $c_0=c_L=1$. The characteristic corresponding polynomial is thus;

$$f(x)=x^0+c_1x^1+....c_lx^l+..c_{L-1}x^{L-1}+x^L \qquad (2)$$

For a given set of feedback coefficients c and an initial state a $(a_0, a_1...,a_{L-1})$ of the register stages, the semi-infinite m-sequence $\{a_j\}=(a_0,a_1,...a_{L-1},a_L...a_j...)$ is uniquely determined as;

$$a_j = \sum_{l=1}^{l} c_{L-1}a_{j-1}, j \geq L \qquad (3)$$

wherein $\Sigma$ indicates modulo-2 addition.

If f(x) is a primitive polynomial and the initial state of non-zero, i.e., if at least one register stage is initially binary 1, then the corresponding LFSR sequence $\{a_j\}$ has a maximum possible period or length of $2^L-1 \equiv J$ binary digits and is called a maximal length sequence (or an m-sequence). Since $a_{j+ji}=a_j$ for any i and j (that is the sequence repeats itself after J digits), the sequence $\{a_j\}$ can be uniquely represented by the first J terms thereof.

Figure 2:
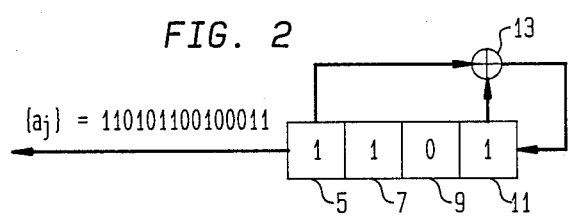
FIG. 2 is a diagram of a 4-stage LFSR with a particular feedback arrangement.

FIG. 2 illustrates a simple LFSR of four stages and thus L=4, with feedback coefficients c=(10011) and initial state a=(1101). The m-s sequence $\{a_j\}$ is generated at the serial output of the register as it is clocked to shift the digits therein to the left. Thus the four initial digits 1101 form the first four digits of $\{a_j\}$. Since c=10011 the only feedback is from stages 5 and 11 through modulo-2 adder 13 to the serial input at stage 11. As each digit is shifted out, the output of adder 13 provides a new digit to stage 11 in accordance with the truth table of such adders. Since L=4 in this case, J=15. For a given primitive polynomial, f(x), or equivalently, c. of degree L, there are $J=2^L-1$ different m-sequences available. These can be specified by J different initial states and thus each of the sequences will start with a different one of the initial states, a. These J different sequences can be thought of as a single sequence specified by J different phase shifts (or starting points) of the given sequence $\{a_j\}$, denoted as $\{a_{j+k}\}$, k=0,1...,J-1. Sequences which differ in phase only are called cyclically equivalent. For simplicity of representation of c and a, octal notation will be used herein, for example in FIG. 2, c=23 (10011) and a=15 (1101) in octal.

Let $\{a_j\}$ be an arbitrary sequence of period J, and consider the sequence $\{b_j\}$ defined by:

$$\{b_j\}=\{a_{Nj}\}; \text{ all } j \geq 0, N=\text{any integer.} \quad (4)$$

Then the sequence $\{b_j\}$ is said to be the decimation-by-N of the sequence $\{a_j\}$ and is denoted by $\{a_{Nj}\}$. The period of the decimation-by-N sequence, $\{a_{Nj}\}$ is J/gcd(J,N). Hence by choosing N relatively prime to J, all decimated sequences will have the same period as the original sequence. If two numbers are relatively prime, they have no common factors other than unity. It will be appreciated that de-interleaving or demultiplexing is a process of decimation of the high speed line signal by the demultiplexing factor, N.

For m-sequences, some interesting facts on decimation are summarized by the following Theorem which is adapted from theorems appearing in the books, *Shift Register Sequences* by Golomb, Revised Ed., Aegean Park Press, 1983, and *Spread Spectrum Communications* by Simon, et al, Vol. 1, Comp. Sci. Press, 1985;

Theorem 1;

(a) Two decimation sequences $\{a_{N1j}\}$ and $\{a_{N2j}\}$ are cyclically equivalent if and only if $N_1$ and $N_2$ belong to the same cyclotomic coset modulo J (i.e., $N_1 = (2^{iN}2)$ modulo J, for some i).

(b) All cyclically distinct m-sequences of period J can be constructed by decimation of $\{a_j\}$.

Notice that the number of proper (i.e., their elements are relatively prime to J) cyclotomic cosets is equal to the number of all primitive polynomials of degree L. For example for the J=15 case, 1, 2, 4 and 8 form a proper cyclotomic coset and also 7, 14, 13 and 11 form another such coset, since these decimations satisfy Theorem 1a. Thus any 15 digit m-sequence can be decimated by 2, 4 or 8 and the resultant sequence will be another cyclically equivalent 15 digit m-sequence which may have the same or a different phase as the original sequence. Also, if any 15 digit m-sequence is decimated by 7 and the resultant decimated sequence again decimated by 2, 4 and 8, another cyclically equivalent coset (7, 14, 13 and 11) will be obtained. Note that decimating by $7 \times 4 = 28$ is the equivalent of decimating by 13, since $28 - 15 = 13$.

Thus in the example of FIG. 2, decimation of $\{a_j\}$ by 2 produces $\{a_{2j}\}=100100011110101$, which is $\{a_j\}$ left shifted by 6 digits of $\{a_j\}$, i.e., $\{a_{2j}\}=\{a_{j+6}\}$. Note that in decimating by 2, for example, the decimated sequence comprises the first, third, fifth, etc. digits of the original sequence. Likewise in decimating by 7, the decimated sequence comprises the first, eighth, and fifteenth, etc. digits of the original. Also, from FIG. 2, if the sequence therein is decimated by 7, $\{a_{7j}\}=101111000100110$ and by 13, $\{a_{13j}\}=110101111000100$, which are sequences which can both be generated by a four stage LFSR with e=31 (11001), but with different initial states, a=13 (1011) and 15 (1101), respectively, and thus are the same sequence with different phases and hence belong to the same proper coset.

Another useful fact about decimation of m-sequences is summarized in the following theorem from the Golomb book, cited above.

Theorem 2;

For each primitive polynomial, f(x), there exists a unique initial state (denoted by a*) that produces an m-sequence $\{a_j\}$ such that $\{a_{N1j}\}=\{a_{N2j}\}$ for any pair $N_1$ and $N_2$ of the same cyclotomic coset.

Thus in the previous example of L=4 and c=23 (10011) of FIG. 2, if the initial state is changed to a*=07 (0111), the resulting sequence $\{a_j\}$ would be 011110111100100 which is decimated by 2, 4 or 8, etc., will yield the same sequence, without any phase offset. Thus $\{a_j\}=\{a_{2j}\}=a_{4j}\}=\{a_{8j}\}$ for the starred initial state (a*). Also, $\{a_{7j}\}=\{a_{14j}\}=\{a_{13j}\}=\{a_{11j}\}=000100110101111$, which can be generated by an LFSR with c=31(11001) and a*=01(0001).

Consider an N to 1 multiplexed signal scrambled at the serial level, in the high speed line, with an m-sequence of period J, $\{a_j\}$, and gcd(J,N)=1, as a result of scrambling in the N tributary lines at a multiplexer input. Suppose, without descrambling at high speed, the signal i demultiplexed. The resultant signal at the first demultiplexer tributary output would be exactly the same as that at the original first tributary signal input. Both the first input and output tributary signals would be scrambled with the decimation-by-N sequence of $\{a_j\}$, which is $\{a_{Nj}\}$, of the same period, J. Similarly, the signal at the (n=1)th tributary output is the same as the original or input tributary signal scrambled by the decimation-by-N sequence of $\{a_{j+n}\}$, which is $\{a_{Nj+n}\}$.

Let $\{b_j\}$ be the scrambling sequence of the first tributary line, i.e., $$\{b_j\}=\{a_{Nj}\} \quad (5)$$

Thus $\{b_j\}$ is the high speed sequence $\{a_j\}$ decimated by the multiplexing factor, N. Theorem 1 tells us that $\{a_j\}$ and $\{b_j\}$ are cyclically equivalent if N is in the same cyclotomic coset $1, 2, \ldots, 2^{L-1}$, and cyclically distinct otherwise. Thus is N is an integral power of 2 up to and including $2^{L-1}$, $\{b_j\}$ and $\{a_j\}$ will be cyclically equivalent which means that each correspond to the same primitive polynomial of the same length J and are both produced by the same LFSR with the same feedback coefficient, c, but may differ in phase due to different initial states of the LFSRs. For other values of N, $\{b_j\}$ and $\{a_j\}$ will be cyclically distinct and the tables of FIGS. 5a-5f show what feedback coefficients c are required to generate $\{b_j\}$, given $\{a_j\}$ and N. FIG. 5 comprises separate tables for all m-sequences for L=3 to L=8, representing respectively sequences of length J from 7 to 155. The top row of each table lists the smallest elements of all proper cosets, called coset leaders. The other members of all of these cosets are obtained by multiplying the coset leader digits by $2^i$, where $i=1,2,\ldots,L-1$. The feedback coefficients, c of all cyclically distinct m-sequences are then-parenthesized octal numbers in the left-most columns of FIG. 5, under coset leader 1. The feedback coefficients of their decimation-by-N sequences are found in the same row in the column under the corresponding coset leader, which is determined by the multiplexing factor, N. For example, if L=6, and the high speed sequence, $\{a_j\}$ has feedback coefficient c=133 and N=10, then the first tributary sequences are generated by c=103, since N=10 is the second member of the proper coset of which 5 is the coset leader. If the high speed line sequence has J=127 with c=203, and N is any of 9, 18, 36, 72, 17 34, or 68, the tributary sequences will all have c=271. Note that the decimation of a 227 digit sequence by $2 \times 72 = 144$ is the same as decimation 1 by 17 which equals 144−127.

It is obvious that the scrambling sequence at the $(n+1)^{th}$ tributary $\{a_{Nj+n}\}$ is cyclically equivalent to the first tributary sequence, $\{a_{Nj}\}$, since they differ only in phase or starting points. That is;

$$\{a_{Nj+n}\} = \{b_{j+\delta(n)}\} \quad (6)$$

which means that the tributary sequences are the decimated-by-N high speed line sequence with a phase offset n. Hence if the phase offsets $\delta^{(n)}$, $n=1,2,\ldots,N-1$ can be determined, then by using $\{b_j\}$ for scrambling the first tributary signal and its phase-shifted sequences for scrambling of the other sequences, one can achieve the desired scrambling/descrambling at the low speed tributary or parallel signal levels.

Equation (6) suggests that the first element or digit of the $(n+1)^{th}$ tributary sequence is equal to the $(\delta^{(n)}+1)^{th}$ element of the first tributary sequence, i.e., $a_n + b\delta_{(n)}$ From Equation (5) we have $b\delta_{(n)} = a\delta_{(n)}N$, therefore, we have;

$$\delta n_N = n \text{ modulo } j \quad (7)$$

Note that $\delta^n = n$ $\delta$modulo J, wherein $\delta$denotes$\delta(1)$. Therefore, if $\}b_j\}$ is the decimation-by-N sequence of an m-sequence $\{a_j\}$ of period J and $\gcd(J,N)=1$, then the decimation-by N sequence of $\{a_{j+n}\}$, $\{a_{Nj+n}\}$, is equal to $\{b_{j+n\delta}\}$, where $\delta$ satisfies the following relation;

$$\delta N = 1 \text{ modulo } J \quad (8)$$

Figure 3:
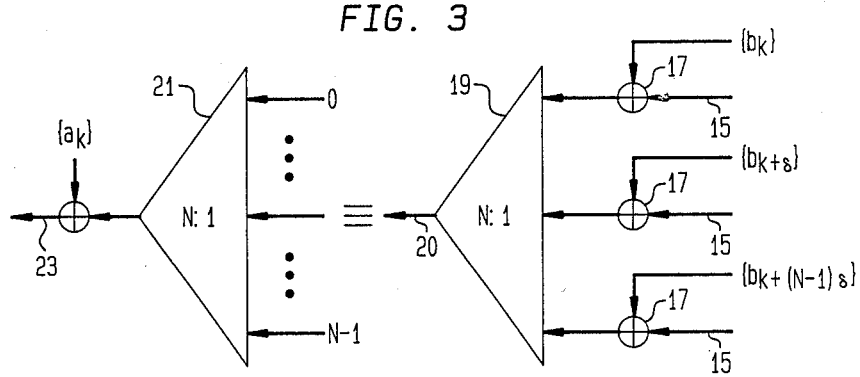
FIGS. 3 and 4 are multiplexer diagrams illustrating the equivalence of low-speed tributary scrambling to high speed line scrambling.

The above relationship provides the phase offsets, $\delta$, between the N tributary m-sequences to guarantee the equivalence to the scrambling in the high speed line by m-sequence $\{a_k\}$. In many practical situations there is no need to have complete knowledge about the resultant high speed line sequence as long as it is an m-sequence of the desired length. In such situations one may simply choose an m-sequence $\{b_k\}$ of the desired length for the first tributary line and offset each succeeding tributary sequence by $\delta$ digits from $\{b_k\}$, as shown in FIG. 3, to achieve equivalent high speed line sequence $\{a_k\}$. In FIG. 3, the N:1 multiplexer 19 has scrambler 17 in each tributary line 15. The scramblers are Exclusive-Or gates which modulo-2 add the tributary intelligence signals on lines 15 to the scrambling sequences. The scrambled tributary lines are then multiplexed to yield on high speed line 20 the scrambled multiplexed signal. This scrambling is the equivalent of scrambling the high speed signal on line 23 at the output of multiplexer 21 with the sequence $\{a_k\}$ as shown on the left side of FIG. 3.

The values of $\delta$ which satisfy Equation (8) are tabulated in FIG. 6 for numerous values of N and J.

To determine the exact relationship between the high speed sequence $\{a_j\}$ and the corresponding first tributary sequence $\{b_j\} = \{a_{Nj}\}$, both the initial state or equivalently the starting point (a) and the feedback coefficient (c) are important. Theorem 2 states that for each primitive polynomial there is a single initial state $a^*$ that yields sets of m-sequences $\{a_j\}$ such that $\{a_{N_1 j}\} = \{a_{N_2 j}\}$ for any $N_1$ and $N_2$ in the same cyclotomic coset. The sets of these starred initial states $a^*$ are listed in the tables of FIGS. 5a-5f in parentheses in octal notation, next to their associated feedback coefficients. Hence if the high speed scrambling sequence has the initial state $a^*$, then the first tributary sequence has the initial state $b^*$ for its corresponding sequence. For example, if $\{a_j\}$ is the sequence generated by an LFSR with feedback coefficient $c=203$ and $a=a^*=177$ then the first tributary sequence for a 36 to 1 multiplexer is the sequence generated by an LFSR with $c=271$ and corresponding $b=b^*=113$. This follows since a 36 to 1 multiplexer has an N which is 4 times the coset leader 9 and thus the tributary sequences have $c=271$ from FIG. 5e. The value of $b^*$ is obtained from the first column of FIG. 5e from the line including the feedback coefficient $c=271$. The value of $\delta$ in this example will be 60 from FIG. 6 and this determines the starting points of all of the other tributary sequences.

For the other (non-starred) initial states, we can also determine the exact phase relationship between the high speed and tributary sequences. Let $\{a_j^*\}$ denote the sequence generated by $a^*$. If the high speed sequence has phase displacement or offset of k compared to $\{a_j^*\}$, i.e., $\{a_j\} = \{a_{j+k}^*\}$, then the first tributary sequence will have a phase offset of $\delta k$ compared to $\{b_j^*\}$ wherein $\delta$ is defined by Eq. (8).

Figure 4:
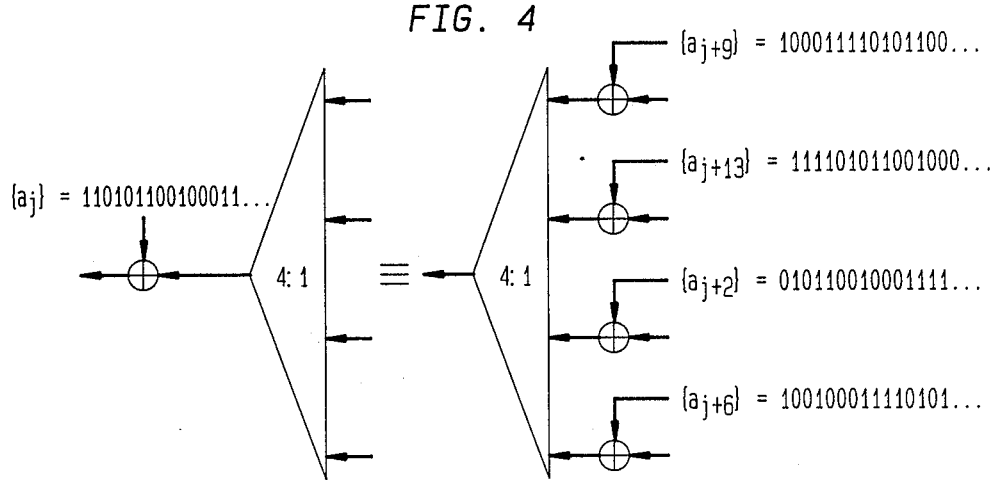

FIG. 4 illustrates the equivalent parallel or tributary scrambling for the sequence of FIG. 2 wherein $c=23$ (10011), $a=15$ (1101), and $J=15$. N in this example is 4. Note that the high speed sequence $\{a_j\}$ has a phase displacement of 3 $(k=3)$ relative to $a^*=07$ (0111), thus $a_j = \{a_{j+3}^*\}$. Since $N=4$ we know that $\{b_j\}$ is cyclically equivalent to $\{a_j\}$, and from FIG. 6 we obtain $\delta=4$. Hence the first tributary sequence $\{b_j\} = \{a_{j+\delta k}^*\} = \{a_{j+12}^*\}$. The second, third, and fourth tributary sequences are then $\{b_{j+4}\}$, $\{b_{j+8}\}$, and $\{b_{j+12}\}$. In terms of $\{a_j\}$, the tributary sequences become $\{a_{j+9}\}$, $\{a_{j+13}\}$, $\{a_{j+2}\}$, and $\{a_{j+6}\}$, as shown in FIG. 4. In this case it was not necessary to utilize the tables of FIG. 5 since N was an integral multiple of 2 and thus the tributary and high speed sequences are the same with different phasing or initial states.

FIG. 7 illustrates all six of the cyclically distinct m-sequences of length $J=31$, all shown with their starred starting phases. These sequences can be used to illustrate some of the mathematical characteristics of m-sequences discussed above. For example, it is easy to verify that decimation of any of these sequences by 2, 4, 8 or 16 results in exactly the same sequence. In decimating sequences it is necessary to repeat the original sequence at least once; or to "go around the corner" to return to the beginning of the original when the end of the single sequence is reached. Also, it is apparent from the table of FIG. 5c that all of the other five of the cyclically distinct sequences of the first column thereof can be derived by decimation of any one of them. For example, if the sequence of FIG. 7a having $c=45$ and $a^*=20$ is decimated by 3, the sequence of FIG. 7d (75(22)) results, and if the same sequence is decimated by 11, the sequence of FIG. 7f (73(35)) results. As a further example, assume that the high speed code at the output of a 5 to 1 multiplexer is the code of FIG. 7b, with $c=73$. Further from FIG. 6, $\delta=25$; thus the first tributary starting point is $\{b_{j+9\delta}^*\} = \{b_{j+9\times 25}^*\} = \{b_{j+225}^*\} = b_{j+8}^*$, since $225 = (7 \times 31) + 8$. Thus the first tributary sequence starts at digit 8 of FIG. 7f, (1001010---), and each succeeding tributary sequence is obtained by adding 25 to the starting point of the preceding sequence.

There are many ways to implement the equivalent tributary scrambling/descrambling in accordance with our invention, as discussed above. In any implementation scheme, the first step is to choose a specific m-sequence of period J which is relatively prime to all multiplexing factors in the system. In order to keep the average densities of 1's and 0's close to 50% it is desirable to use J no smaller than 31 and in practice J=127 would be desirable.

One embodiment of our invention is the implementation scheme illustrated in FIG. 8 for L=5, J=31 and N=6. This implementation is based on the aforementioned co-pending application of Sang Hoon Lee and it utilizes N different L stages LFSRs to generate the N different tributary scrambling codes. The circuit includes 6 to 1 multiplexer 25 with 6 tributary intelligence lines, 0–5 connected thereto via six scrambling gates such as gate 43 in the first tributary line. The six LFSRs are referenced as 27, 29, 31, 33, 35 and 37. All have identical circuitry but each is programmed to operate at a different phase or starting point of the common tributary m-sequence, which in this example is the sequence with feedback coefficient c45. The LFSR 27 comprises a 5 stage register with a single feedback connection through gate 39 as illustrated which is required to generate the aforementioned sequence. The initial condition or digits are inserted into the register 53 from 5 digit loading register 51 during each reset pulse which is synchronized with the system's framing bytes or strobes. The reset line of pulses close the five switches 41 to load the initial states into register 53. If the first tributary sequence $b_j*$ is chosen to have the starred starting point of 20 (10000), the high speed line sequence at the output of the multiplexer 25, $\{a_j\}$ will be the starred starting point of the sequence having feedback code c=73, as indicated by FIG. 5c. These sequences 73(35) and 45(20) are illustrated in FIGS. 7f+7a. From FIG. 6, $\delta=25$ which is the same as minus 5 for a 31 bit code, thus the second through the sixth sequences starting points are obtained by subtracting 5 digits from the starting point of the sequence of the preceding tributary. The initial states of each LFSR are indicated therein, in the loading registers thereof, as well as the starting points relative too $\{b_j*\}$. It is desirable to reset the initial state of each LFSR at every frame since the number of data or intelligence bits per frame may not be an integral multiple of J. Also by resetting at every frame, scrambling errors are limited to within one frame.

A novel alternative to the N LFSRs of FIG. 8 is shown in FIG. 9 wherein a simple low speed J-bit shift register, 55 often called a pure cycling register or a ring register is used to supply all of the properly phased tributary scrambling sequences. The register 55 comprises 31-stage register 56 with the left or 0 stage thereof connected via line 61 to the right hand of 30 stage thereof, to form a simple conductive feedback connection. When such a register is clocked, the binary contents thereof will be continually recirculated around the ring of register stages. The desired m-sequence is loaded into register 56 from storage or loading register 58 through switches 59 which are operated by the reset line. The illustrated tributary sequence has feedback code 45 just as in FIG. 8 with the starred starting point, $a*=20$, and the first tributary sequence is obtained from the first or 0 stage thereof, as illustrated, with the remaining tributary sequences taken from the shift register stages spaced by 26 or $\delta$ digits from each other. The sequence is re-loaded at each frame for the same reasons stated above in connection with the circuit of FIG. 8. A single register of this type will produce all six tributary scrambling codes at the different taps or stages thereof as the register is clocked to continually circulate the desired sequence therein. Such a register has only a simple conductive feedback connection, with no gates in the feedback path, as in the embodiment of FIG. 8. Even though the use of longer sequences such as 127 will result in many more shift register stages compared to using N separate LFSRs as in FIG. 8, the regular structure of the single register with no gates therein and fewer connections results in easier VLSI implementation. Also, the single register is more flexible in that it can accommodate different multiplexing factors merely by changing the taps connected to the tributary scramblers. It should be noted that the separate LFSRs of FIG. 8 have only one gate in the feedback paths thereof because of the particular sequence to be generated in that example, however some sequences would require several such gates, resulting in more complex circuitry for that implementation option. In FIG. 9 the high speed signal on line 62 is $\{a_j\}=73(35)$, just as in FIG. 8.

Figure 10:
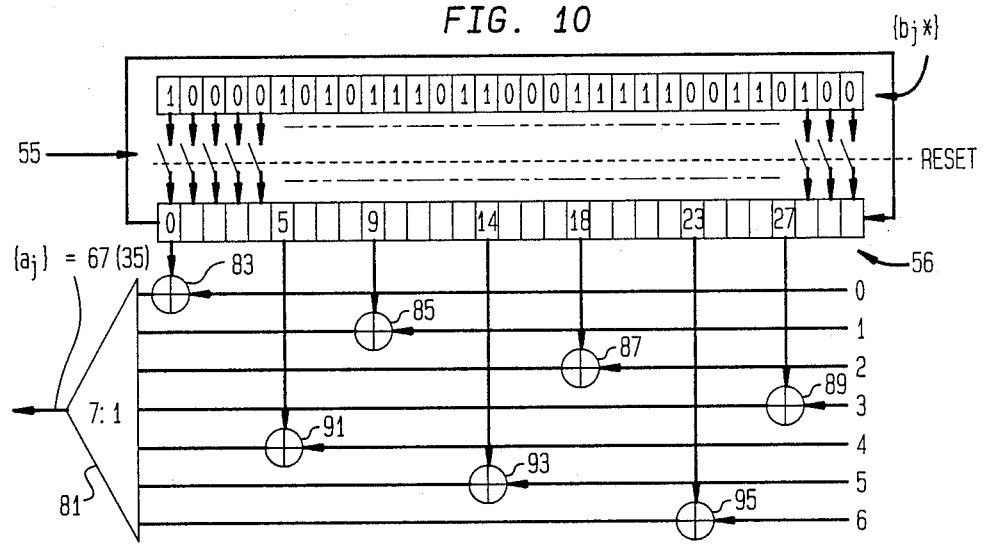
FIG. 10 is a variation of the circuit of FIG. 9, both figures utilizing a single register as a source of N different tributary scrambling/descrambling sequences.

FIG. 10 shows how the same single ring-type shift register 55 can be used to provide different sequences for scrambling 7 tributary signals at the input of 7 to 1 multiplexer 81. The first tributary sequence is the same as in FIGS. 8 and 9, $\{b_j*\}=45(20)$, as indicated in the loading register thereof. The first tributary scrambler 83 is connected to the first or 0 register tap. This insures that the high speed line sequence will be the starred sequence. Since J=31 and N=7, $\delta=9$ from FIG. 6. Thus the second tributary scrambler 85 is connected to register tap 9, the third tributary scrambler 87 to tap 18, etc. Note that the fifth tributary scrambler 91 is connected to tap 5 which is 9 digits beyond tap 27 to which the fourth tributary scrambler 89 is connected. From FIG. 5c it can be seen that if the tributary sequences have feedback code 45, and N=7, the high speed code will have feedback code 67 and the starred initial state 35.

It is apparent that if any J-bit m-sequence is loaded into a J-bit register such as 55 of FIGS. 9 and 10, all J of the different phase shifted sequences can be obtained from the taps thereof.

Figure 11:
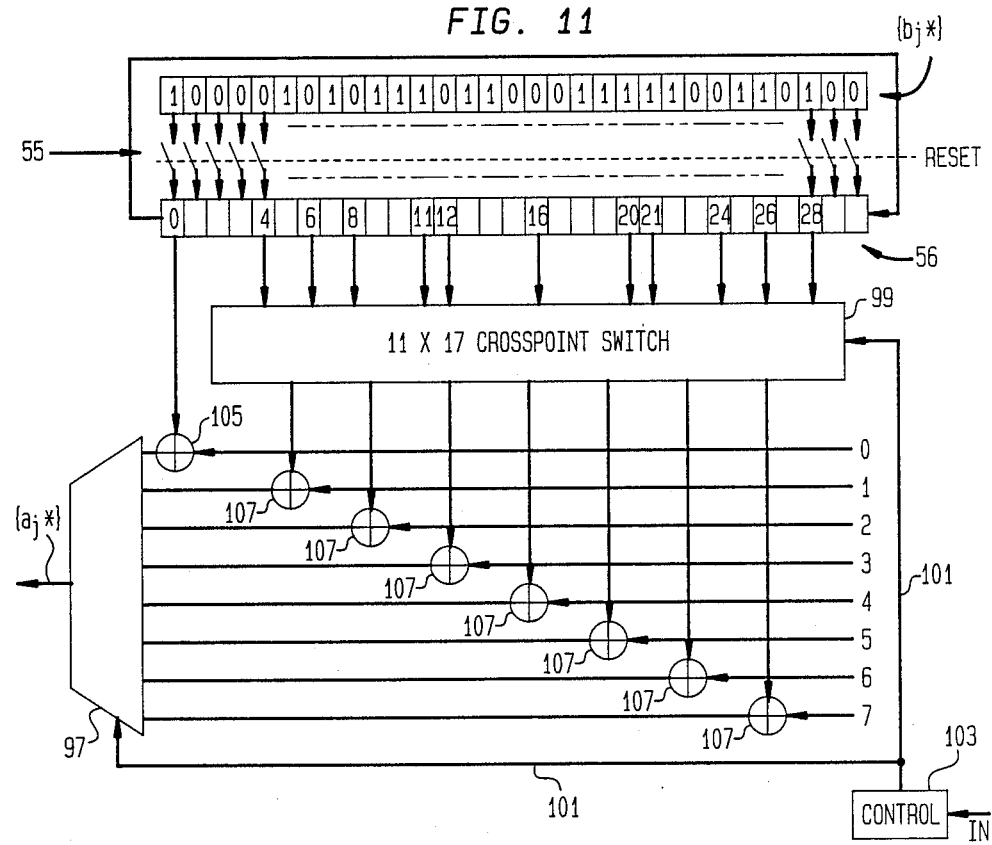
FIG. 11 is a diagram of a multiplex system of variable multiplexing factor, wherein all the scrambling sequences are obtained from a single register.

FIG. 11 shows how a single ring-type J-bit shift register can be used in conjunction with a crosspoint switch and a multiplexer which can be switched to different multiplexing factors, to provide a variable-N multiplexer wherein the proper scrambling codes will be provided for all values of N. In FIG. 11 the J-bit shift register 55 is the same as those of the previous figures and has the same 31 bit code (45(20)) in its loading register. The variable-N multiplexer 97 is capable of being programmed for N=2, 4, 8, 3 or 6 by control circuit 103 via lead 101. The first stage of register 55 is hardwired to the first tributary scrambler 105 as shown, and the other seven scramblers 107 are connected to the outputs of crosspoint switch 99, which is also connected to and controlled by circuit 103. Switch 99 has 11 input connections to the numbered taps of register 55. These taps are the ones which have been predetermined to yield all required sequences for any of the aforementioned programmed values of N. If N is less than 8 some of the tributary lines and scramblers will be idle. For example, if N=2, $\delta=16$, the tap 16 from register 55 would be connected through switch 99 to the scrambler 107 which is receiving the second tributary signal, the first tributary signal always being applied to tributary line 0. If N=4, $\delta=8$ and thus the switch 99 would connect the register taps 8, 16 and 24 to the three tributary scramblers 107 which are receiving the second, third and fourth tributary inputs. This circuitry could be arranged to handle N=7 by modifying the control circuit 103 and connecting additional shift register taps to the switch 99. The switch 99 would have to be modified to handle the larger number of connections to be made.

Figure 12:
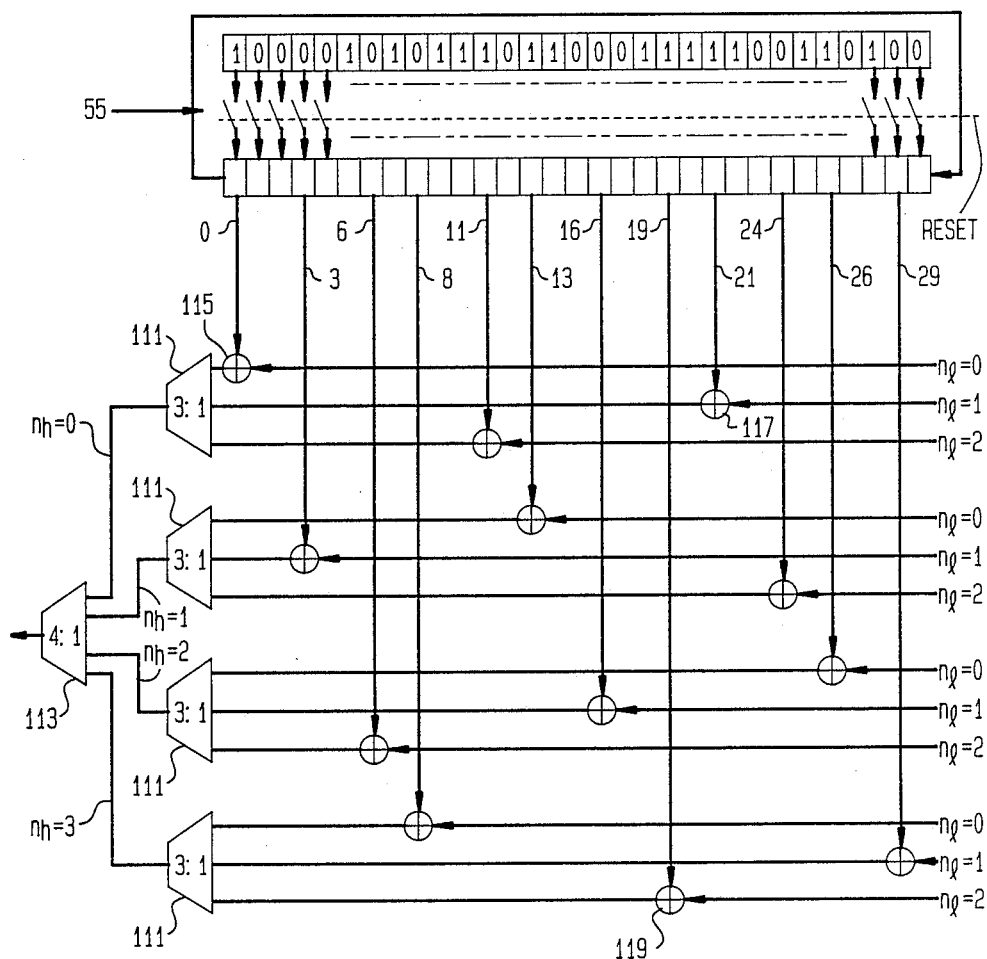
FIG. 12 is a diagram showing how a multi-stage multiplexer system may be scrambled at the lowest tributary level with a single register as a source of all scrambling sequences.

There are some occasions where multi-stage multiplexing is used. Let $N_h$ and $N_l$ be the multiplexing factors of the higher-speed and lower speed multiplers. FIG. 12 shows such a two-stage system where $N_l=3$ and $N_h=4$. Thus there are four 3 to 1 low speed multiplexers 111 which have their high speed lines applied to a single high-speed 4 to 1 multiplexer 113. The three lines applied to each multiplexer 111 are labelled as $n_l=0, 1, 2$ and the four lines at the input of multiplexer 113 are labelled $n_h=0, 1, 2,$ and 3. Both $N_h$ and $N_l$ must be relatively prime to J, which is again 31 in this example. The circuit of FIG. 12 will have a $\delta$ which is determined by the product $N_l \times N_h$, which in this example is 12. Thus from FIG. 6, for $N=12$ and $J=31$, $\delta=13$. One must be careful finding the phase relations for the low-speed scrambling sequences. If $\{b_j\}$ is the first tributary sequence applied to tributary scrambler 115 from register tap 0, then the sequence applied to tributary scrambler 115 from register tap 0, then the sequence at the $(n_l+1)^{th}$ tributary of the $(n_h+1)^{th}$ low speed multiplexer is $\{b_j+(n_h n_l \times N_h)\delta\}$. Thus for the second tributary scrambler 117 connected to the first low-speed multiplexer, $n_h=0$, $n_1=1$ and $N_h=4$, and the required scrambling sequence is $\{b_{j+52-31}\}=\{b_{j+21}\}$. Thus the scrambler 117 is connected to the register tap 21. All of the other scrambler tap connections can be found from the above formula. For example, the last tributary scrambler 119 has $n_1=2$, $n_h=3$ and $N_h=4$, thus $\{b_{j+(3+8)13}\}=\{b_{j+143}\}=\{b_{j+143-(31\times3)}\}=\{b_{j+19}\}$. All of the other tap numbers, which were calculated in this matter are shown in FIG. 12 on the lines from the taps to the tributary scramblers.

It should be noted that while the invention has been describe mainly in connection with multiplexers, it is equally applicable to demultiplexers, and in fact the circuits of the multiplexers herein can be considered as demultiplexers if the direction of signal flow is simply reversed.

The invention is applicable only to frame-synchronous systems and therefore is not applicable to self-synchronous systems wherein the scrambling is data dependent.

While the invention has been described in connection with illustrative embodiments, obvious variations therein will occur to those skilled in the art, without the exercise of invention; accordingly the invention should be limited only by the scope of the appended claims.

What is claimed is:

1. A multiplexed digital communication system comprising;
    one or more multiplexing circuits utilized to interleave tributary signals onto high speed lines or for de-interleaving said high speed signals, said system being frame synchronous,
    said system further comprising means to achieve a desired scrambling sequence, $\{a_j\}$, of length J bits on said high speed lines by the correct choice and phasing of equivalent tributary scrambling sequences, $\{b_j\}$, $\{b_{j+\delta}\}$--- $\{b_{j+n\delta}\}$, also of length J bits, which are used to scramble each of said tributary signals or to descramble such tributary signals at each of said multiplexing circuits, and wherein the number of lines being multiplexed, N, and J are chosen to be relatively prime, wherein said sequence $\{b_j\}$ is the first tributary scrambling/descrambling sequence and is equal to $\{a_j\}$ decimated by N, $\{a_{Nj}\}$, wherein $\delta$ is the phase offset of each succeeding tributary sequence from the said first tributary sequence, wherein $\delta N=1$ modulo J, whereby $\{b_j\}$ will be cyclically equivalent to $\{a_j\}$ if $N=2^i$, $i=1,2 \ldots Ll$, and will be cyclically distinct for other values of N.

2. The system of claim 1 wherein $\{a_j\}$ has the starred starting point (a*) and hence $\{b_j\}$ will have the starred starting point (b*) of its sequence.

3. The system of claim 1 wherein $\{a_j\}$ is offset from its starred starting point by k digits, whereby $\{b_j\}$ will be offset from the starred starting point of its sequence by $k \times \delta$ digits.

4. The system of claim 1 wherein the source of all of said scrambling/descrambling sequences at any multiplexing circuit in said system is a single J-stage ring-type shift register in which the said m-sequence $\{b_j\}$ of J bits constantly circulates, whereby J different cyclically equivalent sequences may be obtained by connecting to the J different taps of said register.

5. In a frame synchronous, multiplexed digital communications system which a desired m-sequence of length J has been selected for scrambling the high-speed signals therein and wherein all of the multiplexing factors, N, in said system are relatively prime to J, said system comprising,
    one or more multiplexers to which tributary signals are applied and one or more demultiplexers from which tributary signals are obtained, said multiplexers and demultiplexers comprising means to scramble/descramble each of said tributary signals with a different equivalent m-sequence of length J, all of said equivalent m-sequences being cyclically equivalent,
    and wherein said means comprises a single J-stage ring-type shift register in which the bit m-sequence constantly circulates, said last-named sequence being the said desired high speed sequence decimated by N,
    whereby N different cyclically equivalent tributary scrambling sequences are obtained from N different taps of said single shift register for the scrambling/descrambling of said tributary signals.

6. The system of claim 5 wherein said N different cyclically equivalent tributary scrambling sequences all have phase offsets from each other $\delta$ bits, wherein $\delta N=1$ modulo J.

7. A variable N multiplexer for a time division multiplexed digital transmission system comprising;
    a variable N bit interleaver having a plurality of tributary lines connected thereto, each of said lines having a scrambler therein,
    a single J-stage ring-type shift register having a J-bit m-sequence circulating therein, wherein J and each of the values of N are chosen as relatively prime,
    the first stage of said register being connected to the scrambler of the first of said tributary lines, and a plurality of the other stages of said register are connected to the remainder of said scramblers of said tributary lines through a switch which is programmed to select a different set of scrambling sequences for each different N to which said bit interleaver can be set.

8. A multi-stage multiplexer system for a digital transmission system, comprising;
    $N_h$ low speed multiplexers each with $N_l$ tributary lines $(n_{l=0},---N_1$- connected thereto, and a single $N_h$ to 1 high speed multiplexer which multiplexes the $N_h$ high speed signals ($n_h=0,\text{---},N_h\text{-}1$) from said low speed multiplexers, said system comprising means to apply a different equivalent scrambling sequence to said $N_h \times N_l$ tributary lines at the inputs of said low speed multiplexers, said equivalent scrambling sequences all being obtained from a single J-bit ring-type shift register in which an m-sequence circulates, said register having taps numbered 0 through $J-1$, the 0 tap providing the scrambling sequence $\{b_j\}$ for the first tributary line, $n_l=0$, of said first, $n_h=0$, low speed multiplexer and wherein the tap connections of the remainder of the tributary lines of said low speed multiplexers are numerically equal to $n_{h+(nl\times Nh)}\delta$ wherein $\delta$ is determined from J and $N_h \times N_l$.

* * * * *